United States Patent [19]

Deman et al.

[11] 4,092,598
[45] May 30, 1978

[54] STATIONS FOR RADIOELECTRIC TRANSMISSION

[75] Inventors: Pierre Deman; René Lechevin, both of Paris, France

[73] Assignee: Thomson-CSF, Paris, France

[21] Appl. No.: 744,277

[22] Filed: Nov. 23, 1976

[30] Foreign Application Priority Data

Nov. 27, 1975  France .................. 75 36356

[51] Int. Cl.² ........................................... G01S 1/02
[52] U.S. Cl. .................. 325/55; 343/100 CS; 179/15.55 T
[58] Field of Search .......... 325/14, 54, 55, 53; 179/15.55 T; 343/100 CS, 9, 16 R

[56] References Cited

U.S. PATENT DOCUMENTS

| | | | |
|---|---|---|---|
| 2,641,755 | 6/1953 | Bartelink | 343/100 CS |
| 3,150,374 | 9/1964 | Sunstein et al. | 179/15.55 T |
| 3,781,890 | 12/1973 | Boyer | 325/55 |
| 3,816,664 | 6/1974 | Koch | 179/15.55 T |
| 3,858,212 | 12/1974 | Tompkins et al. | 343/100 CS |
| 3,973,200 | 8/1976 | Akerberg | 325/55 |

*Primary Examiner*—Robert L. Richardson
*Assistant Examiner*—Tommy P. Chin
*Attorney, Agent, or Firm*—Cushman, Darby & Cushman

[57] ABSTRACT

Stations allowing the use of directional antennas for multiple connections between a master station and each one of subordinate stations. The antenna of a master station M rotates uniformly. When it is directed towards a subordinate station S, the informations to be transmitted, compressed to this end, are transmitted bilaterally. The expansion of the compressed information received takes place regularly. If the stations are mobile, the antennas of the stations S are equipped with an acquisition and servosystem keeping it directed towards the station M.

6 Claims, 4 Drawing Figures

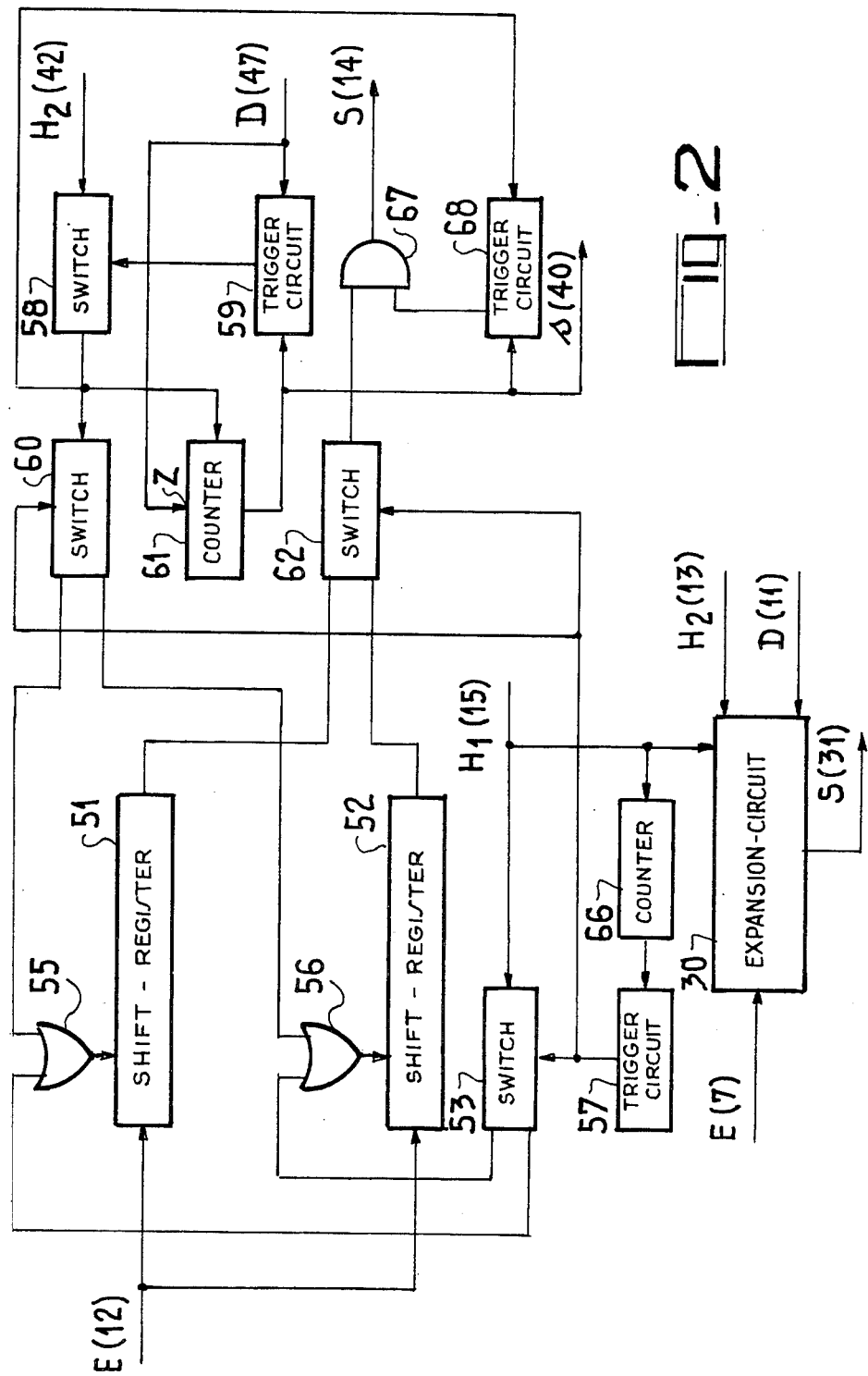

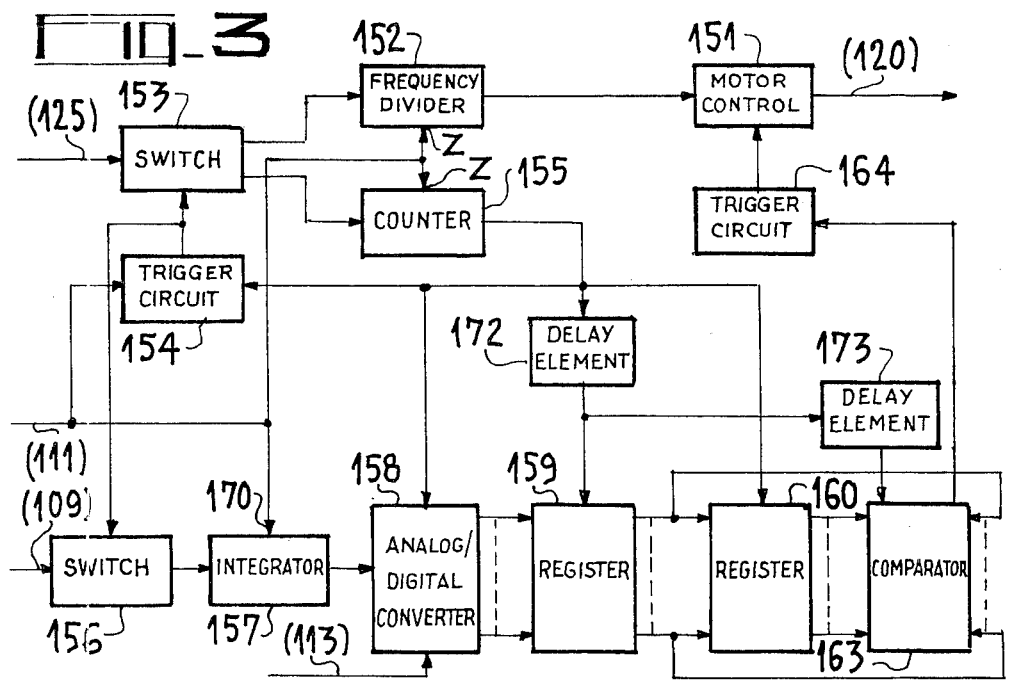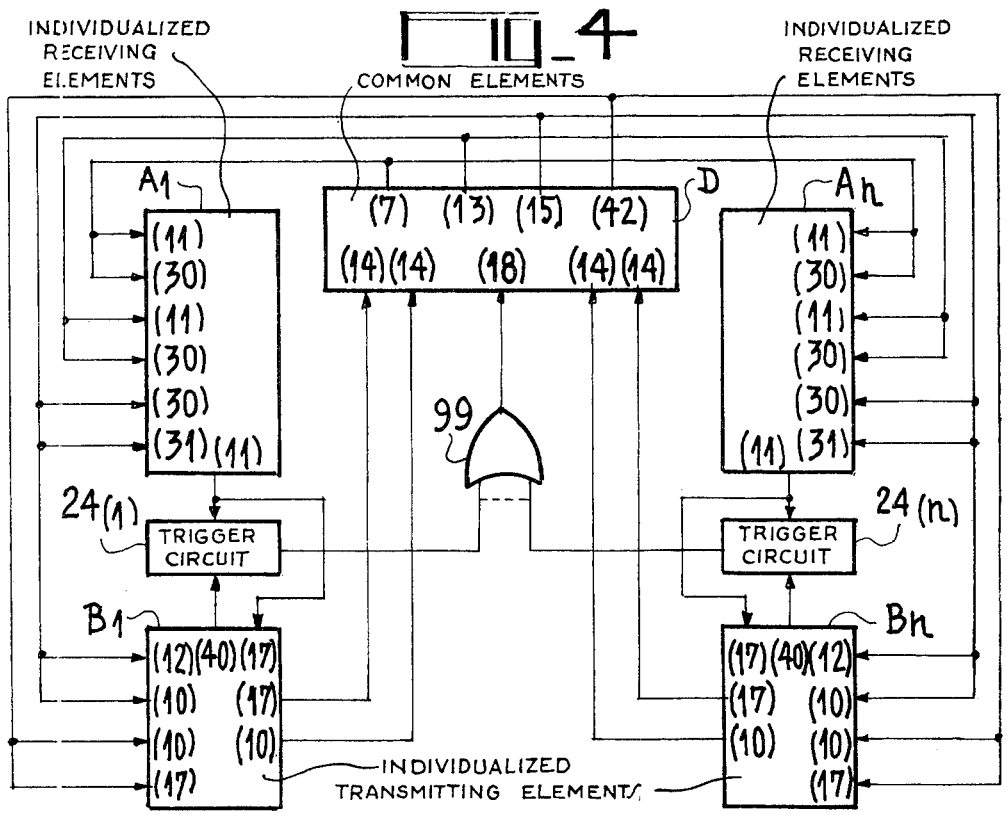

STATIONS FOR RADIOELECTRIC TRANSMISSION

The present invention has for its object a station, which will be called a master station, and a station, which will be called a subordinate station, allowing simultaneous communication from a plurality of subordinate stations to a master station, the transmission being radioelectric and using a directive antenna in each station.

The advantages of radioelectric transmission between directive antennas, in particular at very high frequencies, are well known.

In U.S. Pat. No. 2,641,755 there is described a system allowing communication between a master station and a plurality of subordinate stations, all using directive antennas, and the beam of the master station antenna rotating at a uniform speed as long as none of the subordinate stations wants to communicate with the master station. But in the system of the U.S. patent communication between the master station and a subordinate station requires that the beam from the master stations should remain directed toward this subordinate station, so that simultaneous communication from the several subordinate stations to the master station is impossible.

The present invention has for its object a master station and a subordinate station allowing this result.

According to the invention, there is provided a master station comprising: a directive antenna; means for rotating at a uniform speed the beam of said antenna; means for receiving through said antenna radio frequency signals representative of digital signals and delivering said digital signals; $n$, $n>1$, detecting means coupled to said receiving means for respectively detecting $n$ different identification signals; $n$ time expansion circuits coupled to said receiving means and respectively controlled by said $n$ detecting means, each time expansion circuit comprising a memory, means for recording in said memory a limited number of digital signals delivered by said receiving means upon an identification signal having been detected by the detecting means controlling this time expansion circuit, and means for reading the digital signals recorded in said memory; means for generating a digitally coded master station identifying signal; and additional means for recurrently transmitting through said antenna radio frequency signals representative of said identifying signal.

According to the invention, there is further provided a subordinate station adapted for co-operating with a master station as defined hereinabove, said subordinate station comprising; a directive antenna; means for receiving through said antenna radio frequency signals representative of digital signals and delivering said digital signals; a detecting arrangement coupled to said receiving means for supplying a control signal upon detection of a predetermined identifying signal, subject to this detection being separated from the last supplied control signal by a duration higher than a threshold value; generating means, controlled by said control signal, for generating a digitally coded identification signal; a time compression circuit comprising a memory, means for recording information digital signals in said memory, and means for reading a limited number of digital signals recorded in said memory upon said generating means having generated an identification signal; and means for transmitting through said antenna radio frequency signals representative of said identification signal and of said limited number of digital signals.

The invention will be better understood and other features thereof will become apparent from the following description in conjunction with the accompanying drawings, wherein:

FIG. 2 is a block diagram of the compression system and of the expansion system of the master station shown in FIG. 1;

FIG. 3 is a block diagram of the position tracking system of the subordinate station shown in FIG. 1;

FIG. 4 illustrates, considered with FIG. 1, the structure of the master station.

Figure 1:
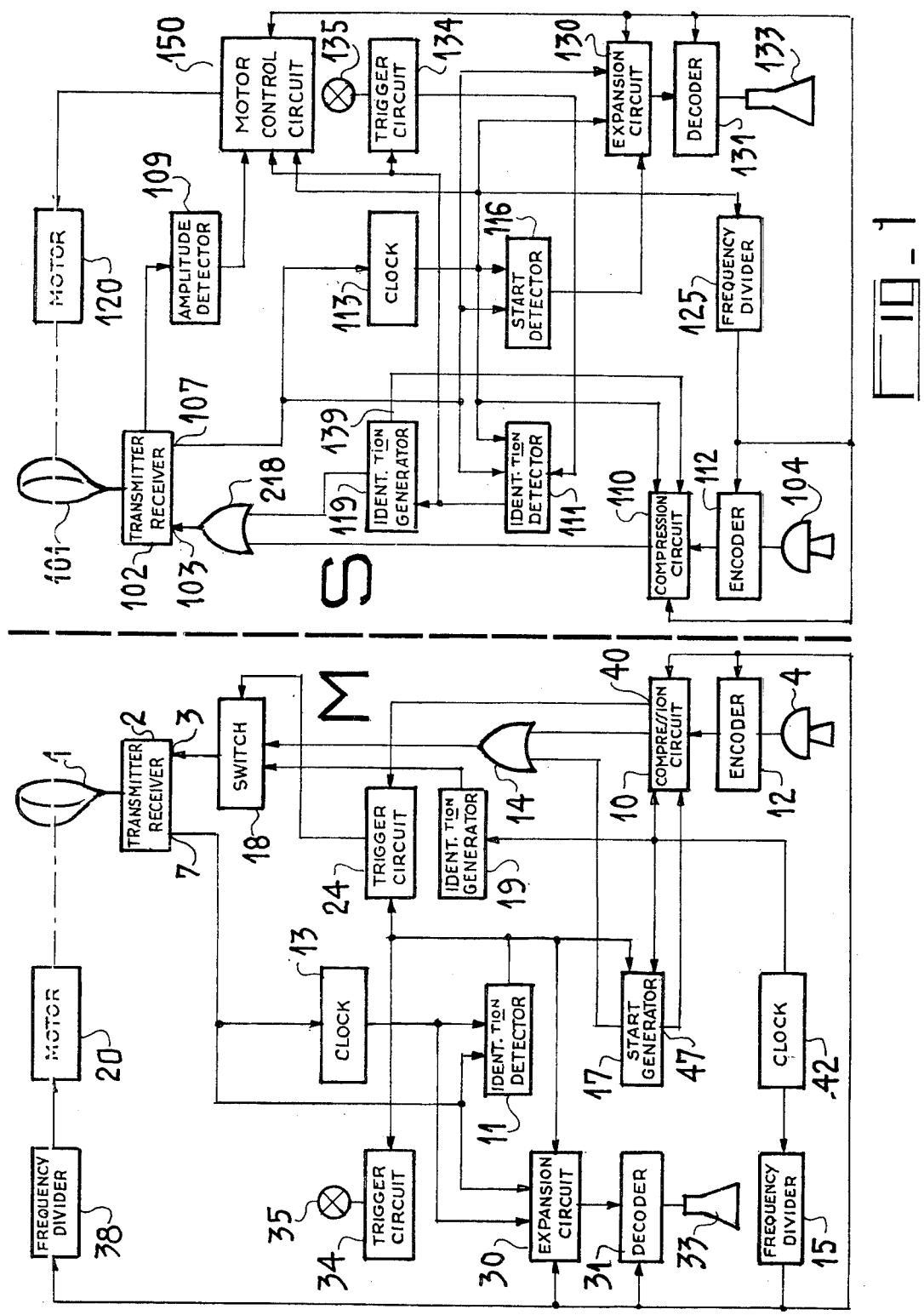
FIG. 1 is a block diagram of one embodiment of a master station and of a subordinate station according to the invention in the case where these two stations are mobile relative to one another, only those elements of the master station which are required for a two-way communication with one subordinate station being shown.

The invention will be described in the case of a telephone connection between a master station and subordinate stations, carried by vehicles.

It is assumed in this example that the distance between the vehicles does not exceed 6 km and that the vehicles remain in the optical visibility range.

FIG. 1 shows block diagrams both of the master station M and of the subordinate station S, these block diagrams being separated by a dotted vertical line.

For a clearer explanation, only those elements of the master station which are required for connection with a single subordinate station are considered first, with the help of FIGS. 1 to 3.

FIG. 4 will show how FIG. 1 is to be modified to take into account the plurality of subordinates stations.

To understand the circuits which are to be described, it is first of all pointed out that the telephone signals coded in each station are regularly coded in delta modulation at a frequency of 20 kilobits/s and, during the periods of effective radioelectric connection between the two stations, are transmitted at a frequency of 2 megabits/s.

In general, corresponding elements of the posts M and S are understood to be identical elements connected in the same way except for differences which will become apparent from the description and such elements of the station S will be denoted by reference numerals increased by 100 in relation to those of the corresponding elements of the station M.

The stations M and S respectively comprise two transmitters-receivers 2 and 102 allowing duplex communications either with the same radio frequency or with two different radio frequencies.

The transmitter-receiver 2 comprises a modulation input 3 for receiving digitally coded signals, and an output 7 for delivering digitally coded signals. The transmitter-receiver 102 has corresponding terminals 103 and 107.

The antennas 1 and 101 coupled with the transmitters-receivers are rotary horn reflectors, their rotation movements being controlled by step-by-step motors 20 and 120, respectively. These two antennas each emit a beam of which the elevation aperture angle is dependent upon the expected declivities in the terrain and which amounts for example to 5°. The azimuthal aperture angle is narrow, for example 4°.

The microphones and listening devices are not directly connected to the modulation input of the stages 2 and 102 and to the output of the frequency demodulators 7 and 107, respectively, these coupling being established through the following circuits.

In the station M, a microphone 4 is connected to the input of a delta encoder 12 supplying 20 kilobits per second and receiving, at its synchronisation input, pulses at a frequency of 20 kc/s from a frequency divider 15 which receives pulses at 2 mc/s from a master clock 42. The output of the encoder 12 is connected to a time compression circuit 10 synchronized on the one hand by the divider 15 and on the other hand by the pulses at 2mc/s supplied by the master clock 42. The output of the circuit 10 may be connected to the modulation input 3 through an OR gate 14 and a switch 18 with two inputs and one output controlled by a bistable trigger circuit 24 with two inputs.

The second input of the OR gate 14 is connected to the output of a generator 17 which, for each pulse received at its control input, supplies a starting signal formed by 30 "1" bits supplied at a rate of 2 megabits/s, each starting signal being preceded by an alternation of 10 1 and 0 bits enabling a slave clock, included in the subordinate station, to be brought into phase before detection of the starting signal proper.

The second input of the switch 18 is connected to the output of a generator 19 which periodically suplies an identification signal, for example of 80 bits, commencing with at least two 1 bits, each identification signal being preceded by an alternation of 10 1 and 0 bits for the same reason as the starting signal.

The generators 19 and 17 are synchronized by the pulses at 2 mc/s supplied by the master clock 42.

In its transmission chain, the station 5 comprises elements 104, 112 and 110 corresponding to the elements 4, 12 and 10 which have just been described. It comprises an identification signal generator 119 which, like the generator 19, supplies a signal of 80 bits commencing with a least two 1 bits, different from that of the station M, and preceded by an alternation of 10 1 and 0 bits. However, the generator 119 is not permanently in operation; it is triggered in the manner described hereinafter. On the other hand, the station S does not have a master clock or frequency divider corresponding to the clock 42 and the divider 15, synchronization being obtained in the manner described hereinafter, or a starting signal generator, its identification signal simultaneously serving as starting signal, or hence a gate corresponding to the OR gate 14. The switch 18 and the bistable circuit 24 by which it is controlled are replaced in the station M by a single OR gate 218 which is connected to the output of the compression circuit 110 and to the output of the identification signal generator 119.

The receiving chain of the station M comprises a clock 13 at 2mc/s equipped with a phase and frequency control circuit responding to the incident bits supplied to it by the output 7 of the transmitter-receiver 2.

The output 7 of the transmitter-receiver 2 feeds a detector 11 for the identification signal of the station S. The detector 11 is formed by a shift register which feeds a correlator effecting a conventional probabilistic decoding, i.e. accepting that a detection signal has been received if a received signal differs from the detection signal by only a small number of bits. The detector 11 receives the pulses of the clock 13.

Finally, the output 7 is connected to the input of a time expansion circuit 30 synchronized by the clock 13 and the frequency divider 15. The circuit 30 is followed by a delta decoder 31 synchronized by the frequency divider 15 and feeding a loudspeaker 33.

The receiving chain of the station S comprises elements 113, 111, 130, 131 and 133 corresponding to the elements 13, 11, 30, 31 and 33 of the station M, given that the detector 11 detects the identification signal of the station M. It additionally comprises a detector 116 for the starting signal of the station S formed by a shift register and a correlator, this detector being fed and synchronized in the same way as the detector 111 for the identification signal.

The clock 113 effects the synchronizations which, in the station M, are effected, for transmission, by the master clock 42. Finally, this clock 113 feeds a frequency divider 125 which supplies pulses at 20 kc/s and which, in the station S, carries out the synchronizations effected in the station M by the divider 15. It can thus be seen that all the synchronization frequencies use in the two stations are synchronized with the master clock 42.

Each of the compression circuits 10 and 110 and expansion circuits 30 and 130 comprises a memory, a recording circuit and a reading circuit. These circuits will be described with reference to FIG. 2.

The station S comprises an amplitude detector 109 coupled to the transmitter-receiver 102 so as to deliver a signal whose amplitude increases with the received energy.

The remainder of the elements and interconnections in the stations M and S will be described at the same time as the operation of these stations.

The antenna 1 is driven at a uniform speed of 5 revolutions per second (readily achieved with antennas for millimetric waves) by the motor 20 of which the step is 0.45°. The motor 20 thus receives pulses at a frequency of 4000 c/s at its control input, these pulses being obtained in a divider 38 which divides the pulses of the divider 15 by 5.

It will first be assumed for the sake of simplicity that acquisition has been effected and that the antenna 101 remains directed towards the antenna 1 by means a control system included in a circuit 150, for controlling the motor 120. The circuit 150 receives the signals from the detector 109, the frequency divider 125, the identification detector 111 and the clock 113.

Outside of the effective radioelectric connection periods, of which the duration is approximately (1/5) (4/360) = 2.2 ms, the station M regularly transmits its identification signal, for which purpose the switch 18 connects the modulation input 3 to its second input and hence to the generator 19. The generator 19 supplies the identification signal proper of duration $(80/2.10^6)$ s = 0.04 ms with a recurrence period of 0.045 ms (allowing for the alternation of 10 1 and 0 bits preceding the signal of 80 bits).

The reading circuits of the compression systems and the recording circuits of the expansion systems are blocked for as long as they are not triggered in the manner described hereinafter.

In both stations, a speaker may talk in front of the microphone. These telephone signals are encoded and recorded in the compression circuits. On the other hand, the signals recorded in the expansion circuits in the manner described hereinafter are also regularly read and decoded in the delta decoder which feeds the loudspeakers.

At a given moment, when the beam of the antenna 1 is directed towards the antenna 101, the latter picks up the signals of the station M and the detector 111 rapidly detects an identification signal. It then delivers a pulse I which triggers the identification signal generator 119.

The corresponding signals transmitted by the gate 218 to the modulation input 103 of the stages 102 are transmitted by the antenna 101. When the generator 119 transmits the last bit of the identification signal, it supplies, at an auxiliary output 139, a pulse which is applied to the compression circuit 110 and initiates the reading, without any discontinuity with the identification signal, at a frequency of 2 mc/s of 4000 bits recorded in the memory of the compression circuit 110, corresponding to the numbers of bits recorded during one revolution of the antenna 1.

The pulse I supplied by the detector 111 is on the other hand delivered to the control circuit 150 of the motor 10.

The identification signal transmitted by the station S is received by the station M and detected by the detector 11. The detector 11 then supplies a pulse which is used on the one hand for triggering the recording circuit of the expansion system 30 and the starting signal generator 17 and on the other hand for tripping the bistable circuit 24 into the "1" state so that under the action thereof the switch 18 connects the modulation input 3 to the output of the gate 14. When the generator 17 supplies the last bit of the starting signal, it delivers, at an auxiliary output 47, a pulse which initiates reading in the compression circuit 10, reading taking place in the same way as in the station S. In the station M, however, the circuit 10 comprises an auxiliary output 40 which, on completion of reading, delivers a pulse to the second input of the bistable circuit 24 so that the bistable circuit 24 gives back to the 0-state and the switch 18 re-establishes the coupling between the modulation input 3 and the identification signal generator so that the transmission of the identification signal is resumed.

In the station S, the signals transmitted by the station M are received in the same way as the station M receives the signals of the station S, except that it is the starting signal detector 116 which, when it has detected the starting signal, initiates the recording of the telephone bits in the expasnion circuit 130 by a pulse applied to that circuit.

It is pointed out that, in the process described above, a second identification signal of the station M would normally be received at the station S before the response of the station S has interrupted the transmission of these identification signals of the station M. The detector 111 comprises a temporary blocking circuit which prevents it from effecting two such detections of identification signals transmitted in the course of the same radioelectric connection. This blocking circuit is formed by an input AND gate of which an input receives the signals from the output 107 of the transmitter-receiver 102 and the other of which is blocked by a monostable circuit 134 when the latter is triggered by an output pulses of the detector 111. The duration of the quasi-stable state of the circuit 134 is slightly shorter than the time taken by the antenna 1 to complete one revolution.

An an indication in the two stations that the connection is being correctly made, i.e. that the antenna 101 remains directed towards the antenna 1, the station S comprises a luminous device 135 which illuminates under the control of the monostable circuit 34 so that it appears constantly illuminated when the monostable circuit receives pulses at a rate of the order of 5 per second and is rapidly extinguished in the opposite case.

The station M comprises a similar arrangement 34–35; the monostable circuit 34 receives the signals from the detector 11, but does not block it following the reception of a pulse from that detector.

The initial acquisition, or search after loss of acquisition, takes place in the manner described in reference to FIG. 3 by means of the circuit 150.

FIG. 2 illustrates the compression circuit 10 and the expansion circuit 30 of the master station M.

The inputs and outputs of these circuits are denoted by the reference numerals, placed in brackets, of the elements of FIG. 1 to which the inputs and outputs are connected.

The coded bits arriving at the input (12) of the compression circuit are alternately loaded, in groups of 4000 bits, into two shift registers 51 and 52 each having 4000 stages. To this end, the input (12) is connected to the bit inputs of the two registers. The input (15) supplying pulses at a frequency of 20 kc/s is connected to the clock inputs of the two registers through a switch 53 and two OR gates 55 and 56, respectively.

The input (15) also feeds a modulo 4000 counter 66 which, when it has counted 4000 pulses, supplies an output pulse which is applied to the control input of a single-input bistable circuit 57 of which the output is connected to the control input of the switch 53.

The reading circuit uses the pulses at 2mc/s received at the input (42). This input is connected to the input of a switch 58 controlled by a bistable trigger circuit 59 with two inputs "1" and "0", the input "1" receiving from the input (47) of the circuit the pulses of the auxiliary output 47 of the starting signal generator 17. The output of the switch 58 feeds a switch 60 whose two outputs are respectively connected to OR gates 55 and 56 and, on the other hand, a modulo 4000 counter 61 which, when it has counted 4000 pulses, delivers a pulse to the input "0" of the bistable circuit 59. Initial synchronization is obtained by a connection between the input (47) and the zeroing input Z of the counter. Like the switch 53, the switch 60 is controlled by the output of the bistable trigger circuit 57 so that, when the switch 53 connects its input to the OR gate 56, the switch 60 connects its input to the OR gate 55 and vice versa, so that reading always takes place at the register which is not in the course of loading.

The outputs of the registers 51 and 52 are connected to the two inputs of a switch 62 which is controlled in synchronism with the switch 60 by the output of the bistable circuit 57. Switch 62 output is connected to one input of an AND gate 67 of which the second input is connected to the output of a two-input bistable trigger circuit 68. Circuit 68 input "1" receives the output pulses from the switch 58 and its input "0" receives the output signal of the counter 61, delay elements being inserted into the inputs of the bistable circuit 68 so that the AND gate 67 is only unblocked for the passage of the 4000 bits read.

The output of the AND gate 67 forms the output (14) of the compression circuit.

On the other hand, the output of the counter 61 forms the auxiliary output 40 (FIG. 1) of the compression circuit.

The circuit which has just been described may be considered as having an input E supplying the bits to be recorded, an input $H_2$ supplying the clock pulses at the frequency of 2mc/s, an input $H_1$ supplying the pulses at the frequency of 20 kc/s, an input D supplying a signal for starting the operation, in this case reading, at 2mc/s, an output S supplying the bits read and an auxiliary output s supplying a signal marking the end of the operation at 2mc/s, E, H₁, H₂, D, S and s corresponding respectively to the inputs (12), (15), (42), (47) and the outputs (14) and (40) of the compression circuits and these inputs and outputs having been denoted by this double notation.

The expansion circuit 30 has the same structure as the compression circuit 10 with the provision that it is not the two recordings on the one hand and the two readings on the other hand, but instead the operations at the frequency of 2mc/s on the one hand and the operations at the frequency of 20kc/s on the other hand, which are made to correspond in the two circuits. Accordingly, this expansion circuit has been globally represented by a block 30 having an input E which in this case corresponds to the input (7) coming from the transmitter-receiver, an input H₁ corresponding, like that of the compression circuit, to the input (15), an input H₂ formed in this case by the input (13) coming from the clock 13, an input D corresponding in this case to the input (11) coming from the identification signal detector and an output S going towards the decoder 31. The auxiliary output s of the counter 61 of the compression circuit (which auxiliary output controls resumption of the transmission of the identification signal) does not have an equivalent in the expansion circuit.

The compression and expansion circuits of the subordinate station have the same structure as those of the master station, the connections of the inputs and outputs being as follows: compression circuit 110:

E: (112); H₁: (125); H₂: (113); D: (119); S: 218); s: no equivalent.

expansion circuit 130:

E: (107); H₁: (125); H₂: (113); D: (116); S: (131); s: no equivalent.

According to known art, the inputs supplying the recording clock pulses are followed by delay elements which enable the recordings to be made on well-formed bits and not on transitions. These delay elements have not been shown in FIG. 2.

FIG. 3 illustrates the direction tracking system 150 of the station S.

In this drawing, as in FIG. 2, the references of the elements of FIG. 1, to which the inputs and outputs of the circuit 150 are connected, have been put in brackets.

The circuit 150 receives the pulses at 20kc/s from the divider 125, the pulses at 2mc/s from the clock 113, the pulses I from the detector 111 for the identification signal of the station M and the output signal of the amplitude detector 109.

The pulses at 20kc/s are applied to the signal input of a two-output switch 153, of which the first output is connected to a divider by 500, 152, and the second to a counter 155 which is able to count 44 pulses from its zero state and which delivers an output pulse when it reaches its maximum count 44. A bistable trigger circuit 154, of which the 1-state input receives the pulses I of the detector 111, has its 0-state input connected to the output of the counter 155 and its output connected to the control input of the switch 153. The switch 153 connects its input to the counter 155 when the trigger circuit 154 is in the 1-state and to the divider 152 in the opposite case. The counter forming the divider 152 and the counter 155 have zeroing inputs Z which receive the pulses I of the detector 111. The trigger circuit 154 performs the function of a monostable circuit which would pass into the 1-state for a duration of 2.2 ms ± 0.05 ms each time it received a pulse I.

When the bistable trigger circuit 154 is in the zero state, the divider 152 supplies pulses at the frequency of 40c/s to a circuit 151 for controlling the step-by-step motor 120. The motor 120 whose step is equal to that of the motor 20, is of the type which rotates in one direction or the other, according to the polarity of the pulses delivered to it.

The circuit 151 is formed by an amplifier which, at a first output, delivers the pulses received from the divider 152 with a positive polarity, and at a second output delivers these same pulses with a negative polarity, the two outputs of the amplifier being connected to the output of the circuit 151 and hence to the control input of the motor through a switch which directs the positive pulses or the negative pulses towards the output of the circuit 151 according to whether its control input receives a "1" or "0" signal.

The output signal of the detector 109 is applied to the signal input of a switch 156 whose control input is connected to the output of the trigger circuit 154 so that this switch is closed when the trigger circuit is in the 1-state. The output signal of the switch 156 feeds an integrator-amplifier 157 which is discharged under the control of the pulses I applied to it at an input 170.

The output signal of the integrator-amplifier 157 is applied to the input of an analog-digital converter 158 of which the sampling control input receives the output pulses of the counter 155. The converter 158 is if the pulse-counting type, the pulses being supplied by the clock 113, and supplies its output count at parallel outputs connected to the various stages of a register 159 comprising a recording input which receives the output pulses of the counter 155 through a delay element 172 which imparts a very slight delay so that the register receives the output count of the converter 158 immediately after the formation thereof.

The outputs of the various stages of the register 159 are connected to the inputs of the stages of a register 160 comprising a recording input which receives the (undelayed) output pulses of the counter 155.

When the counter 155 delivers a pulse, the converter 158 effects the conversion of the integrated signal into a digital signal while the contents of the register 159 are loaded into the register 160, after which the output signal of the converter is loaded into the register 159.

The outputs of the stages of the registers 159 and 160 are connected to the two inputs of a digital comparator 163 which at a comparison control input receives the output pulses of the delay element 172 by way of another delay element 173 which imparts a slight additional delay thereto.

The comparator 163 supplies a zero signal if the digital signal applied to its first input by the register 159 (the more recent digital signal of the two digital signals which are applied to it) is greater than that which is applied to the second input, and a positive pulse in the opposite case, its output signal being zero between two comparison control pulses. The positive pulses supplied by the comparator 163 are applied to a single-input bistable trigger circuit 164 which changes state for each pulse received.

The output of the bistable circuit is connected to the input of the circuit 151 for controlling the output switch thereof.

In the event of initial acquisition or loss of acquisition, there is no pulse I or no longer any pulse I or, hence, comparison. The bistable circuit 164 remains in the same state, the circuit 150 receives from the divider 152 pulses at 40c/s which determine its rotation always in the same direction, an acquisition or a new acquisition requiring at most 20 seconds.

In the control periods, the arrangement described causes the motor to rotate (when trigger circuit 154 is in the 0-state) always in the same direction, as long as this rotation increases the signal integrated by the integrator-amplifier 157 from one integration period to the following integration period, and then, if this result is not achieved, to rotate the motor in the opposite direction.

The circuits have been described in detail with reference to the case of one subordinate station, but the master station is designed for communication with several subordinate stations, the multiple connections with the master station being possible on condition that two stations S are not simultaneously swept by the master station beam.

The structure of each station S remains unchanged in relation to FIG. 1, it being understood that each station S has a separate identification signal; in particular all the station S use the same radio frequency.

If, reverting to FIG. 1, the station M is considered, the elements to be individualised for the connections with the various stations S are as follows:

For reception: the identification signal detector 11, the expansion circuit 30 and the delta decoder 31. The devices 34-35 for indicating effective connections also have to be individualised. The loudspeaker 33 may optionally be common, depending upon the organisation of the vehicle. It has been assumed that it was individualised. The individualised elements for the station $S_i$ will be collectively denoted by the reference $A_i$ (FIG. 4).

For transmission, it is simpler to individualise the starting signal generator 17 due to the fact that it triggers the associated compression circuits, so that in this case the individualized elements, in addition to the generator 17, are the encoder 12 and the compression circuit 10.

The microphone 4 may optionally by common. It has been assumed that it was individualized. The individualized transmission elements for the station $S_i$ are collectively denoted by the reference $B_i$.

The bistable circuit 24 is also individualized.

FIG. 4 only shows the individualized blocks for the first and the last subordinate stations $S_1$ and $S_n$, these blocks being denoted by the references $A_1$ and $A_n$, $B_1$ and $B_n$ and 24(*l*) and 24(*n*).

The collection D of the other elements of the station M remains unchanged except for the fact that the connections made with an individualized element are multiplied by *n*, the OR gate 14 is now a gate which 2*n* inputs and the switch 18 is controlled by an OR gate 99 which receives the output signals of the bistable trigger circuits 24. It will be recalled that the switch 18 in FIG. 1 transmits to the transmitter either the identification signal or the starting and conversation signals, depending on whether the trigger circuit is in the 0-state or the 1-state. Accordingly, it may be controlled in this case by the collection of trigger circuits because the "1" state of one bistable circuit and the "0" state of the others result in the transmission of the output signal of the gate 14.

The connections of the blocks $A_1$, $A_n$, $B_1$, $B_n$ and D have been shown more precisely in FIG. 4 by indicating, for each input and each output of a block, the number between brackets of the element of the block fed by the considered input or of the element of the block feeding the considered output.

It is of course possible to provide mixed stations capable of performing the function either of a master station or of a subordinate station with appropriate switching operations, retaining a number of common elements. It will be observed that a device may be used in the master station for localizing the subordinate stations, as concerns their bearing relatively to a direction fixed relatively to the master station, and distance relatively thereto. As concerns bearing a detector identical to the detector 109 of the subordinate station may be used together with a device generating a signal proportional to the instantaneous position of the beam relatively to the reference direction. As for the distance the time elapsing between the identification signal last transmitted by the master station and the identification signal last received from a subordinate station makes it possible to known it without ambiguity provided the time corresponding to the go and return distance is less than the period of the master station identification signals.

As said hereinabove the transmitter-receivers 2 and 102 may be of any type allowing duplex operation.

With a continuous carrier wave the type of modulation used is advantageously angle modulation. In this case the amplitude detector 109 of the station S may be coupled to the output of the intermediate frequency stage of the receiver.

A transceiver allowing duplex operation with a single radio frequency has been described in Australian patent application No. 471,541 filed Dec. 22, 1972.

It comprises a superregenerative stage, the latter including a millimetric wave oscillator formed by a resonant cavity, into which an avalanche diode is inserted, and released by a pulse generator comprising a frequency modulation input connected to the output of a modulation amplifier, the resting frequencies of the pulse generators being different for the two transceivers of a link. In the present case the pulse generator would be frequency modulated by digitally coded signals, and the resting frequency would be the same for all the subordinate station, for example $F_s = $ 60mc/s and different for the master station, for example $F_M = $ 70mc/s.

The station M transmits then oscillation trains with a variable recurrence frequency $f_M = F_M + f$, while the station S transmits oscillation trains with the recurrence frequency $f_S = F_S + f'$, $f$ and $f'$ being the frequency deviations due to the modulation of the pulses generators during transmission.

Since the oscillating diode of the resonant cavity 2 also performs a detection function, the transmitter-receiver of the master station supplies inter alia a component at the frequency $f_M - f_S$ which, in the receiving chain, is isolated by a filter and mixed with the output signal of frequency $f_M$ of the pulse generator to reconstitute the signal of frequency $f_S$ which is then amplified and frequency demodulated.

The station S comprises corresponding elements, the frequency $f_M$ reconstituted in this case by the mixing of $f_M = f_S$ and $f_S$ and its frequency demodulator being centred on $F_M$.

In this case the amplitude detector 109 may receive the same signal as the frequency demodulator.

Since the detection characteristic of the superregenerative stage is logarithmic, the detector 109 supplies signals proportional to the logarithm of the energies received by the antenna 101.

Finally, the system according to the invention may be used for a communication network between fixed stations, thus eliminating the need for the position tracking system of the subordinate stations.

Finally, a network of one-way connections would be possible, in which case the master station would receive information while transmitting only its identification signal.

Of course; the invention is not limited to the embodiments described an shown which were given solely by way of example.

It will be observed that inhibiting means have been provided in each subordinate station for preventing two or more detections of the master station identifying signal when the beam from the latter sweeps the subordinate station.

The same result can be obtained through preventing the detector output signal from playing the part of a control signal.

Of course the invention is not limited to the embodiments described and shown which were given solely by way of example.

What is claimed is:

1. A master station comprising: a directive antenna; means for rotating at a uniform speed the beam of said antenna; means for receiving through said antenna radio frequency signals representative of digital signals and delivering said digital signals; $n$, $n>1$, detecting means coupled to said receiving means for respectively detecting $n$ different digitally coded identification signals; $n$ time expansion circuits coupled to said receiving means and respectively controlled by said $n$ detecting means, each time expansion circuit comprising a memory, means for recording in said memory a limited number of digital signals delivered by said receiving means upon an identification signal having been detected by the detecting means controlling this time expansion circuit, and means for reading the digital signals recorded in said memory; means for generating a digitally coded master station identifying signal; and additional means for recurrently transmitting through said antenna radio frequency signals representative of said identifying signal.

2. A subordinate station adapted for co-operating with a master station as claimed in claim 1, said subordinate station comprising: a directive antenna; means for receiving through said antenna radio frequency signals representative of digital signals and delivering said digital signals; a detecting arrangement coupled to said receiving means for supplying a control signal upon detection of said identifying signal, subject to this detection being separated from a last supplied control signal by a duration longer than a threshold value; generating means, controlled by said control signal, for generating one particular signal of said $n$ different identification signals; a time compression circuit comprising a memory, means for recording information digital signals in said memory, and means for reading a limited number of digital signals recorded in said memory upon said generating means having generated said particular signal; and means for transmitting through said antenna radiofrequency signals representative of said particular signal and of said last mentioned limited number of digital signals.

3. A master station as claimed in claim 1 further comprising $n$ time compression circuits respectively corresponding to said $n$ detecting means, each time compression circuit comprising a memory, means for recording information digital signals in this memory, and reading means for reading digital signals recorded in this memory; further means for generating a coded start signal; means for, upon one of said $n$ detecting means having detected the respective identification signal, successively causing said further means to generate a coded start signal and the reading means of the time compression circuit corresponding to said one of said detecting means to read a limited number of digital signals; and means for transmitting through said antenna radiofrequency signals representative of said start signal and said last mentioned limited number of digital signals; said additional means transmitting said radiofrequency signals representative of said identifying signal during each time interval comprised between the end of the transmission of radiofrequency signals representative of digital signals read in a compression circuit and the detection of the respective identification signal.

4. A subordinate station as claimed in claim 2, further comprising a further detecting means coupled to said receiving means for detecting a predetermined coded start signal; and a further time expansion circuit coupled to said receiving means, and comprising an additional memory, means for, upon said further detecting means having detected said start signal, recording in said additional memory a limited number of digital signals delivered by said receiving means, and means for reading said last mentioned limited number of digital signals.

5. A subordinate station as claimed in claim 2, comprising an amplitude detector coupled to said receiving means for delivering a signal which is a function of the radiofrequency energy received and a servosystem controlled by said amplitude detecting means for substantially directing the beam of said antenna in the direction for which the amplitude of the output signal from said amplitude detector is at a maximum.

6. A subordinate station as claimed in claim 5, wherein said servosystem comprises means for integrating the output signal from said amplitude detector for a substantially constant duration upon said detecting arrangement delivering a control signal; comparison means for comparing the integrated signal last obtained with the preceding one; and means controlled by said comparison means for, after each comparison, rotating the beam of said antenna in one direction or the other, depending upon the result of the comparison, until the appearance of a further control signal from said detecting arrangement.

* * * * *